(12) United States Patent
Bruvelaitis et al.

(10) Patent No.: US 6,307,734 B1
(45) Date of Patent: Oct. 23, 2001

(54) ELECTROLYTIC CAPACITOR

(75) Inventors: Sigmund Bruno Alexander Bruvelaitis; Angelina Rodriguez, both of El Paso, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/441,829

(22) Filed: Nov. 17, 1999

Related U.S. Application Data

(60) Provisional application No. 60/114,335, filed on Dec. 31, 1998, now abandoned.

(51) Int. Cl.[7] .............................. H01G 2/02; H01G 2/10
(52) U.S. Cl. .......................... 361/513; 361/517; 361/535
(58) Field of Search ...................... 361/511, 512, 361/513, 517–19, 520, 530, 535–538, 539–540

(56) References Cited

U.S. PATENT DOCUMENTS

| | | |
|---|---|---|
| 2,012,359 | 8/1935 | Sprague . |
| 2,129,089 * | 9/1938 | Hood .................................... 361/531 |
| 2,274,327 | 2/1942 | Georgiev et al. . |
| 2,758,259 * | 7/1956 | Peck ..................................... 361/513 |
| 2,856,570 * | 10/1958 | Peck ..................................... 361/513 |
| 3,182,238 | 5/1965 | Toder et al. . |
| 3,221,217 | 11/1965 | Hucke . |
| 3,250,969 | 5/1966 | Fanning et al. . |
| 3,354,359 | 11/1967 | Ford et al. . |
| 3,422,319 | 1/1969 | Yeamans . |
| 3,463,969 | 8/1969 | Wershey . |
| 3,509,427 | 4/1970 | Ruscetta . |
| 3,551,756 * | 12/1970 | Frekko ................................. 361/539 |
| 3,648,337 | 3/1972 | Greskamp et al. . |
| 3,831,070 | 8/1974 | Bouille et al. . |
| 4,221,033 | 9/1980 | Kobayashi . |
| 4,245,277 | 1/1981 | van Gils et al. . |
| 4,339,786 * | 7/1982 | Evans et al. ........................ 361/513 |
| 4,342,070 * | 7/1982 | Evans ................................... 361/513 |
| 4,352,147 | 9/1982 | Elias et al. . |
| 4,479,168 | 10/1984 | Green, Jr. . |
| 4,589,058 | 5/1986 | Peternell et al. . |
| 4,802,063 | 1/1989 | Carino . |
| 4,841,410 | 6/1989 | Maijers et al. . |
| 4,853,825 | 8/1989 | Utner . |
| 4,987,518 | 1/1991 | Dain . |
| 4,987,519 | 1/1991 | Hutchins et al. . |
| 5,400,211 | 3/1995 | Evans . |
| 5,580,358 | 12/1996 | Narusawa et al. . |
| 5,673,168 | 9/1997 | Efford et al. . |
| 5,777,840 | 7/1998 | Oney . |
| 5,784,247 | 7/1998 | Stevens et al. . |

\* cited by examiner

*Primary Examiner*—Anthony Dinkins
(74) *Attorney, Agent, or Firm*—Carl B. Horton, Esq.; Damian Wasserbauer, Esq.; Armstrong Teasdale LLP

(57) ABSTRACT

An electrolytic capacitor utilizing a cannister with an indentation for compressing a silicone potting compound to supply pressure on a capacitor cartridge is described. The indentation includes a bead that extends around an outer surface of the cannister.

19 Claims, 1 Drawing Sheet

ELECTROLYTIC CAPACITOR

CROSS REFERENCE TO RELATED APPLICATION

This application claims the benefit of U.S. Provisional Application No. 60/114,335, filed Dec. 31, 1998 now abandoned.

BACKGROUND OF THE INVENTION

This invention relates generally to capacitors and, more particularly, to electrolytic capacitors that include a potting compound.

Electrolytic capacitors typically include a capacitor cartridge positioned within a cannister that is then sealed with a cover. The cannister generally includes a side wall connected to a bottom. The capacitor cartridge is placed in the cannister through an opening in the top. A cover is then placed over the opening and sealed onto the cannister. The cover includes terminals that are electrically connected to the capacitor cartridge.

A problem can occur with the above described electrolytic capacitor if the capacitor is subjected to vibrations. The vibrations can shake the capacitor cartridge loose and a short can occur. Ultimately the unit can fail. One solution to this problem has been to utilize a potting compound within the cannister. Typical potting compounds include tar or wax. However, both tar and wax are flammable and often occupy too much free space within the cannister. Free space is desirable in the cannister due to gas expansion caused by operation of the capacitor. Additionally, the capacitor cartridge may lose elasticity over time and may no longer be secured by the tar or the wax.

BRIEF SUMMARY OF THE INVENTION

In an exemplary embodiment, an electrolytic capacitor utilizes a cannister with an indentation for compressing a silicone potting compound to supply pressure on a capacitor cartridge. The indentation includes a bead that extends around an outer surface of the cannister.

The silicone potting compound is added to the cannister with sufficient empty space remaining in the cannister to allow adequate room for gas expansion during operation of the capacitor. The indentation in the cannister maintains the compression of the silicone on the cartridge at a consistent and uniform rate and allows the silicone to adhere to both the cannister and the cartridge.

The silicone potting compound has a low flammability rating and is elastic. In addition, the silicone is able to retain its elasticity over a broad range of temperatures. Due to the elastic characteristics of the silicone, the cartridge remains fixedly secured within the cannister even when the cannister is subjected to prolonged vibrations.

DETAILED DESCRIPTION OF THE INVENTION

Figure 1:
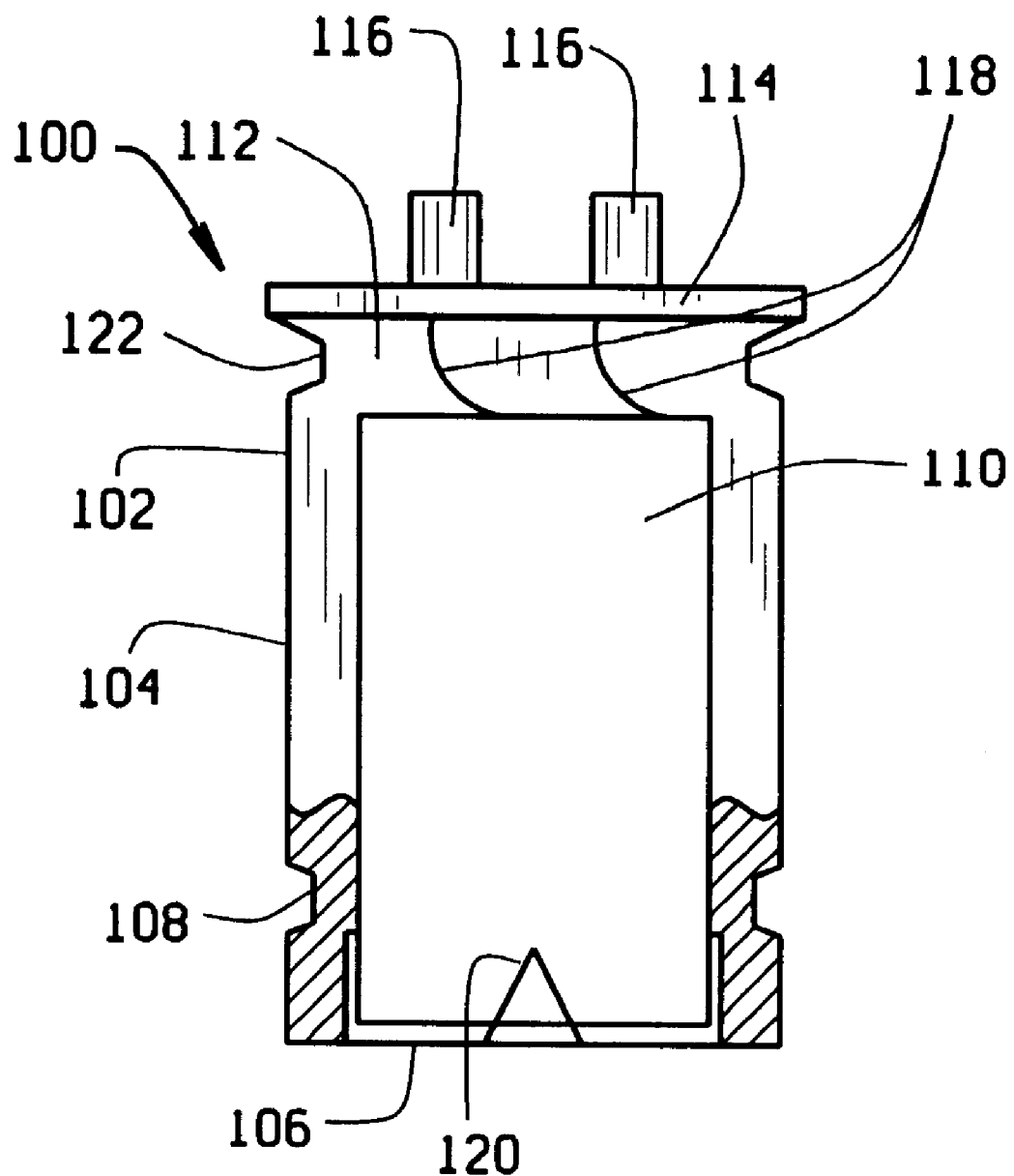
FIG. 1 is a schematic view of an electrolytic capacitor according to one embodiment of the present invention

FIG. 1 is a schematic view of an electrolytic capacitor 100 including a can, or cannister, 102. Cannister 102 includes a sidewall 104 connected to a bottom 106. Sidewall 104 includes an indentation 108 that extends along an outer diameter of cannister 102. Capacitor 100 also includes a capacitor cartridge 110 positioned within cannister 102. In an exemplary embodiment, capacitor cartridge 110 is fabricated from a wound roll (not shown) including two aluminum oxide coated foils separated by paper spacers. The wound roll is impregnated in an electrolyte (not shown).

Capacitor 100 also includes an opening 112. A cover 114 fits over opening 112 and is connected to cannister 102 to seal cannister 102. The seal prevents moisture from entering the cannister and compounds from exiting the capacitor. Cover 114 is fabricated from a phenolic compound, as is well known in the art, and includes two terminals 116. A pair of tabs 118 extend from the capacitor cartridge foils and connect to terminals 116. In one embodiment, tabs 118 are fabricated from aluminum and are welded to the capacitor cartridge foils to form an electrical connection between the capacitor cartridge foils and terminals 116.

Cannister 102 is fabricated from aluminum and includes a bottom centering pin 120 extending into an opening (not shown) in capacitor cartridge 110. Centering pin 120 is located at a center of bottom 106 and maintains capacitor cartridge 110 centered within cannister 102. In one embodiment, centering pin 120 is an indentation in bottom 106. Alternatively, centering pin 120 could be attached to bottom 106 such as by welding or soldering.

Indentation 108 is a bead that extends along an outer diameter of cannister 102. Indentation 108 is formed along a bottom portion of cannister 102 after a silicone potting compound has been added to canister 102 (as described in greater detail below). Indentation 108 extends inward towards a center of cannister 102 approximately $\frac{1}{16}$ of an inch to approximately $\frac{1}{8}$ of an inch (approximately 1.59 millimeters to approximately 3.18 millimeters). In one embodiment, indentation 108 extends entirely around cannister 102. Alternatively, indentation 108 can extend only partially around cannister 102.

The silicone potting compound is added to cannister 102 to fill less than about half of the empty space within cannister 102. More particularly, the silicone potting compound fills about one third of the empty space within cannister 102. The level of the potting compound is chosen so that sufficient free space remains within cannister 102 to allow adequate room for gas expansion during operation of capacitor 100. Additionally, the location of indentation 108 is chosen so that formation of indentation 108 compresses the silicone potting compound. The indentation in the cannister maintains the compression of the silicone on the cartridge at a consistent and uniform rate and allows the silicone to adhere to both the cannister and the cartridge. In one embodiment, the silicone potting compound is RTV 627, parts A and B, available from General Electric Silicone, Waterford, N.Y. 12188. Alternatively, the silicone potting compound could be Dow Corning 170 parts A and B, available from Dow Corning Corporation, Auburn, Mich. 48611. A problem with known potting compounds has been that once the capacitor cartridge becomes soggy and loses its elasticity, the potting compound may no longer maintain the capacitor cartridge firmly in place. The silicone potting compound is elastic and maintains its elasticity throughout a wide range of temperatures. For example, the typical ambient operating temperature range for capacitor 100 is approximately −40° C. to approximately 105° C. and the silicone potting compound temperature range encompasses this range. Additionally, due to the elastic characteristics of the silicone potting compound, capacitor cartridge 110 will remain rigid after the silicone potting compound is cured and will not lose its tension in the compound. Further, the silicone potting compound is substantially flame retardant and has a UL Flammability rating of V0, flame retardant.

Alternatively, cannister 102 could include a plurality of indentations, such as dimples, that extend around a circumference of cannister 102 and along sidewall 104 from bottom 106 to opening 112. The dimples serve the same purpose as the bead. The dimples compress the silicone potting compound which then applies pressure to capacitor cartridge 110. In addition, at least some of the dimples extend to capacitor cartridge 110 and maintain contact therewith. These dimples can be positioned above the level of the silicone potting compound since they extend to cartridge 110. The dimples exert pressure on the potting compound, which is transmitted to cartridge 110 and compresses cartridge 110.

Cannister 102 further includes an indentation 122 adjacent opening 112 which interacts with cover 114. Specifically, indentation 122 is a bead that extends around an outer diameter of cannister 102. The bead provides a seating surface for cover 114 and allows for a sealing fit of cover 114 onto cannister 102. Indentation 122 can extend entirely around cannister 102. Alternatively, indentation can extend partially around cannister 102.

Capacitor 100 is able to maintain capacitor cartridge 112 firmly secured with the use of the silicone potting compound. Due to the elastic characteristics of the silicone potting compound, capacitor cartridge 110 remains fixedly secured within cannister 102 even when cannister 102 is subjected to prolonged vibrations.

While the invention has been described in terms of various specific embodiments, those skilled in the art will recognize that the invention can be practiced with modification within the spirit and scope of the claims.

What is claimed is:

1. An electrolytic capacitor comprising:
   a capacitor cartridge;
   a can for placement of said cartridge, said can including at least one indentation for securing said cartridge within said can;
   a silicone potting compound within said can; and
   a cover fixed to said can, said cover including at least one terminal that is electrically connected to said cartridge.

2. An electrolytic capacitor in accordance with claim 1 wherein said indentation includes a bead along an outer diameter of said can for exerting pressure on said cartridge.

3. An electrolytic capacitor in accordance with claim 1 wherein said silicone potting compound fills less than half of said can when said cartridge is positioned within said can.

4. An electrolytic capacitor in accordance with claim 1 wherein said at least one terminal comprises two terminals and said capacitor cartridge comprises two aluminum oxide coated foils separated by paper spacers.

5. An electrolytic capacitor in accordance with claim 4 further comprising tabs electrically connecting said foils to said terminals.

6. An electrolytic capacitor in accordance with claim 1 wherein said indentations are a plurality of dimples for applying pressure to said capacitor cartridge.

7. An electrolytic capacitor in accordance with claim 2 wherein said bead applies pressure to said silicone potting compound which applies pressure to said capacitor cartridge.

8. An electrolytic capacitor in accordance with claim 1 further comprising a centering pin on a bottom of said can for contacting and centering said cartridge.

9. An electrolytic capacitor in accordance with claim 2 further comprising a second bead on said can adjacent said cover.

10. An electrolytic capacitor in accordance with claim 1 wherein said cover is a phenolic cover.

11. An electrolytic capacitor comprising:
    a capacitor cartridge;
    a can comprising a bottom, a side wall, and an opening, said side wall including at least one indentation;
    a silicone potting compound within said can, wherein said indentation applies pressure to said potting compound for securing said cartridge within said can; and
    a cover positioned over said opening and electrically connected to said can, said cover electrically connected to said cartridge.

12. An electrolytic capacitor in accordance with claim 11 wherein said indentation includes a bead along an outer diameter of said can.

13. An electrolytic capacitor in accordance with claim 11 wherein said silicone potting compound fills less than half of said can when said cartridge is positioned within said can.

14. An electrolytic capacitor in accordance with claim 11 further comprising tabs electrically connected to said terminals, said capacitor cartridge comprises two aluminum oxide coated foils separated by paper spacers and electrically connected to said tabs.

15. An electrolytic capacitor in accordance with claim 11 wherein said bottom of said cannister includes a centering pin for contacting and centering said cartridge.

16. An electrolytic capacitor comprising:
    a capacitor cartridge;
    a can comprising a wall;
    a silicone potting compound within said can;
    said wall including an indentation configured to apply pressure to said potting compound and secure said cartridge within said can; and
    a cover positioned over said opening and electrically connected to said can, said cover electrically connected to said cartridge.

17. An electrolytic capacitor in accordance with claim 16 wherein said indentation extending along an outer diameter of said can.

18. An electrolytic capacitor in accordance with claim 16 wherein said silicone potting compound fills less than half of said can.

19. An electrolytic capacitor in accordance with claim 16 wherein said can includes a centering pin extending from a bottom of said can.

* * * * *